US012636875B1

(12) United States Patent
Robertson

(10) Patent No.: US 12,636,875 B1
(45) Date of Patent: May 26, 2026

(54) METHODS AND KITS FOR SCREEN-PRINTING

(71) Applicant: Quinn Robertson, Brooklyn, NY (US)

(72) Inventor: Quinn Robertson, Brooklyn, NY (US)

( * ) Notice: Subject to any disclaimer, the term of this patent is extended or adjusted under 35 U.S.C. 154(b) by 0 days.

(21) Appl. No.: 19/175,911

(22) Filed: Apr. 10, 2025

(51) Int. Cl.
*B41C 1/14* (2006.01)
*B41C 1/06* (2006.01)
*B41M 1/12* (2006.01)
*B41M 1/26* (2006.01)
*B41M 7/00* (2006.01)

(52) U.S. Cl.
CPC ................ *B41C 1/147* (2013.01); *B41C 1/06* (2013.01); *B41M 1/12* (2013.01); *B41M 1/26* (2013.01); *B41M 7/009* (2013.01); *B41P 2200/42* (2013.01)

(58) Field of Classification Search
CPC ............ B41C 1/147; B41C 1/06; B41M 1/12; B41M 1/26; B41M 7/009; B41P 2200/42
See application file for complete search history.

(56) References Cited

U.S. PATENT DOCUMENTS

| | | | | |
|---|---|---|---|---|
| 4,114,535 | A | 9/1978 | Deshpande | |
| 5,253,581 | A | 10/1993 | Miki | |
| 5,622,108 | A * | 4/1997 | Benedetto | B41F 15/0804 101/127.1 |
| 5,819,653 | A | 10/1998 | Mccue | |
| 5,927,191 | A * | 7/1999 | Wheatley, Jr. | B41C 1/14 101/129 |
| 6,038,971 | A | 3/2000 | Fischer | |
| 6,092,462 | A | 7/2000 | Watanabe | |
| 10,488,362 | B2 | 11/2019 | Laurenson | |
| 11,376,837 | B2 | 7/2022 | Harwell | |
| 2003/0224108 | A1 * | 12/2003 | Pollara | B41M 1/34 427/386 |

FOREIGN PATENT DOCUMENTS

| | | | |
|---|---|---|---|
| CN | 108146059 | B | 11/2023 |
| EP | 0108509 | A2 | 5/1984 |
| JP | H0780342 | B2 | 8/1995 |

OTHER PUBLICATIONS

Mondaymerch, Stencil Printing: Printing Techniques Explained, https://www.mondaymerch.com/resources/printing-techniques/stencil-printing-printing-techniques-explained, Published Mar. 5, 2024 (Year: 2024).*

(Continued)

*Primary Examiner* — Stephen D Meier
*Assistant Examiner* — Quang X Nguyen
(74) *Attorney, Agent, or Firm* — Dentons US LLP

(57) ABSTRACT

Some disclosed technologies enable a method, which includes enabling an end user to access (i) a sheet of thermal stencil paper, (ii) a thermal printer, (iii) a writing implement, (iv) a substrate, and (v) a data file containing a content; cause the thermal printer to print a copy of the content onto the sheet of thermal stencil paper without perforating or puncturing the sheet of thermal stencil paper such that the sheet of thermal stencil paper becomes a stencil sheet stenciling the copy; place the stencil sheet onto the substrate; and cause the writing implement to write on the stencil sheet such that the copy is further copied onto the substrate.

22 Claims, 4 Drawing Sheets

(56) References Cited

OTHER PUBLICATIONS

Starkman, How to Use a Thermal Copier to Print Tattoo Stencils, https://www.painfulpleasures.com/community/help-center/tattoo-information/how-use-thermal-copier-print-tattoo-stencils/, Published Jun. 5, 2015 (Year: 2015).*

Brzozowski, How to Use Transfer Paper: A Beginner's Guide, https://tattooswizard.com/blog/how-to-use-transfer-paper-a-beginners-guide, Published Feb. 21, 2024 (Year: 2024).*

Amazon, iDPRT MT890 Portable Wireless Printer—with Thermal 4A Paper, Bluetooth Inkless Printer for Travel/Home, Support US Letter@A4&A5 Size, Mobile Printer Compatible with IOS, Android and Laptop—Blue, downloaded from internet Apr. 10, 2025, https://www.amazon.com/iDPRT-MT890-Portable-Wireless-Printer/dp/B0CXPVH459/ref=sr_1_1?crid=FBJT1NIFLJI0&dib=eyJ2ljoiMSJ9.s370_rZtwEAHWhiRkq-qUEarLjS_1_y6N3AJQAcyG2D0NJktE6yXel8635h6XSk9lig9DzxyqO3yEWLEqVGF4o6Vzh9F7OofZs2LVS-wiqiZ1Z2xB9wZFF8pWXqrnkQrzsZuytH3J_f49idouRVzB8X2X31-WK8DyBpBbcoiRDg4vwZH9J8g2cssx5vzzmc.G65tAuz3kcyOZUxnB3o41mWy7SHlHbILcMS5-O81hxc&dib_tag=se&keywords=idprt%28mt890&gid=173938868l&sprefix=idprt%2Bmt890%2Caps%2C291&sr=8-1&th=1.

Amazon, P90 Wireless Tattoo Stencil Printer—Professional & Beginner Friendly, Bluetooth & USB Connectivity, Free Stencil Paper Included, downloaded from internet Apr. 10, 2025, https://www.amazon.com/PeriPage-Wireless-Tattoo-Stencil-Printer/dp/B0D9D1ZSW8/ref=sr_1_1_sspa?dib=eyJ2ljoiMSJ9.3mLMp3noy0BIFF632w6xcb7vr5T52.WbHl5DqFBolRiof1SpMpXbua6gJhtV_t5c-Dp36AlHUKSqihPIDKfcd82SJQEI1zhNs9nRezp-VViyampZ5Wmua2WF78U8ss7Vdzd2B65ozpoE5ekKcbwbUhBvs0gprmTvEllsgONC5wWC0yWuiF8i9agqg7IAAqg9nCQicPvKnaA8tZpg0g8Bvfuw-faWCdwvolL7twr6RdL2ELpADaP2bZAX7npPcW_rddZAlc7uc3oExSn3rN53tuCgqawOuSCJsS0UiY3YvyE.9LvmvZMcHFce8-OA_ZgD5Rt8Azy2laVAOvn2_RdQos&dib_tag=se&keywords=tattoo+stencil+printer+bluetooth&qid=1730924728&sr=8-1-spons&sp_csd=d2lkZ2V0TmFtZT1zcF9hdGY&psc=1.

Ebay, Genuine Riso Master S7040UA/S7040UA CB/B4 UA Master Rolls for CV1200/CV3230, downloaded from internet Apr. 10, 2025, https://www.ebay.com/itm/387593048396.

Riso Safety Data Sheet, Riso Master CZ, Revision Date Sep. 25, 2020 (3 pages).

* cited by examiner

METHODS AND KITS FOR SCREEN-PRINTING

TECHNICAL FIELD

This disclosure relates to technologies for screen-printing.

BACKGROUND

Screen printing is a printing technique that often uses a stencil with a partially blocked mesh screen to transfer a volume of ink onto a surface. As such, regions of the screen are blocked to prevent the volume of ink from passing through the screen in order to create a design on the surface. Screen printing is a common method for creating high quality printed products. However, the techniques used to prepare stencils are technologically problematic for various reasons. First, the processes used to create stencils are labor-intensive and require a significant amount of time, specialized equipment and materials, and a large workshop space. For example, a conventional process for preparing a stencil may require a plastic mesh frame, emulsion chemicals, a high-cost inkjet/laser printer, plastic transparency sheets, a specialized exposure unit, a hose/power washer, and a washing bin. Creating a conventional stencil can take anywhere from one hour with professional equipment to twelve or more hours with an at-home setup in which the stencil must be left to dry overnight.

Alternative methods to screen printing, such as sublimation printing, direct-to-film (DTF) printing, and direct-to-garment (DTG) printing, are available for creating printed products. However, these alternative techniques are also technologically problematic for various reasons. For example, although sublimation printing can provide printing with bright colors, sublimation printers are costly, and sublimation printing is only compatible with polyester substrates. DTF printing requires even more costly and specialized equipment, along with specialized inks/powders and a ventilated workspace due to the toxic fumes that may be created during the printing process. Meanwhile, DTG printing requires even more costly equipment, is limited to cotton or other natural fiber substrates, and is not desired for bulk printing due to the long print time per item.

SUMMARY

Broadly, this disclosure enables various technologies that at least partially address various technological problems identified above. For example, some of those technologies enable a method, which includes enabling an end user to access (i) a sheet of thermal stencil paper, (ii) a thermal printer, (iii) a writing implement, (iv) a substrate, and (v) a data file containing a content; cause the thermal printer to print a copy of the content onto the sheet of thermal stencil paper without perforating or puncturing the sheet of thermal stencil paper such that the sheet of thermal stencil paper becomes a stencil sheet stenciling the copy; place the stencil sheet onto the substrate; and cause the writing implement to write on the stencil sheet such that the copy is further copied onto the substrate. However, other technologies may enable a kit that includes a container storing a thermal printer, a sheet of thermal stencil paper, a writing implement, and a set of instructions to perform a method, which includes enabling an end user to: access (i) the sheet of thermal stencil paper, (ii) the thermal printer, (iii) the writing implement, (iv) a substrate, and (v) a data file containing a content; cause the thermal printer to print a copy of the content onto the sheet of thermal stencil paper without perforating or puncturing the sheet of thermal stencil paper such that the sheet of thermal stencil paper becomes a stencil sheet stenciling the copy; place the stencil sheet onto the substrate; and cause the writing implement to write on the stencil sheet such that the copy is further copied onto the substrate.

DETAILED DESCRIPTION

Figure 1:
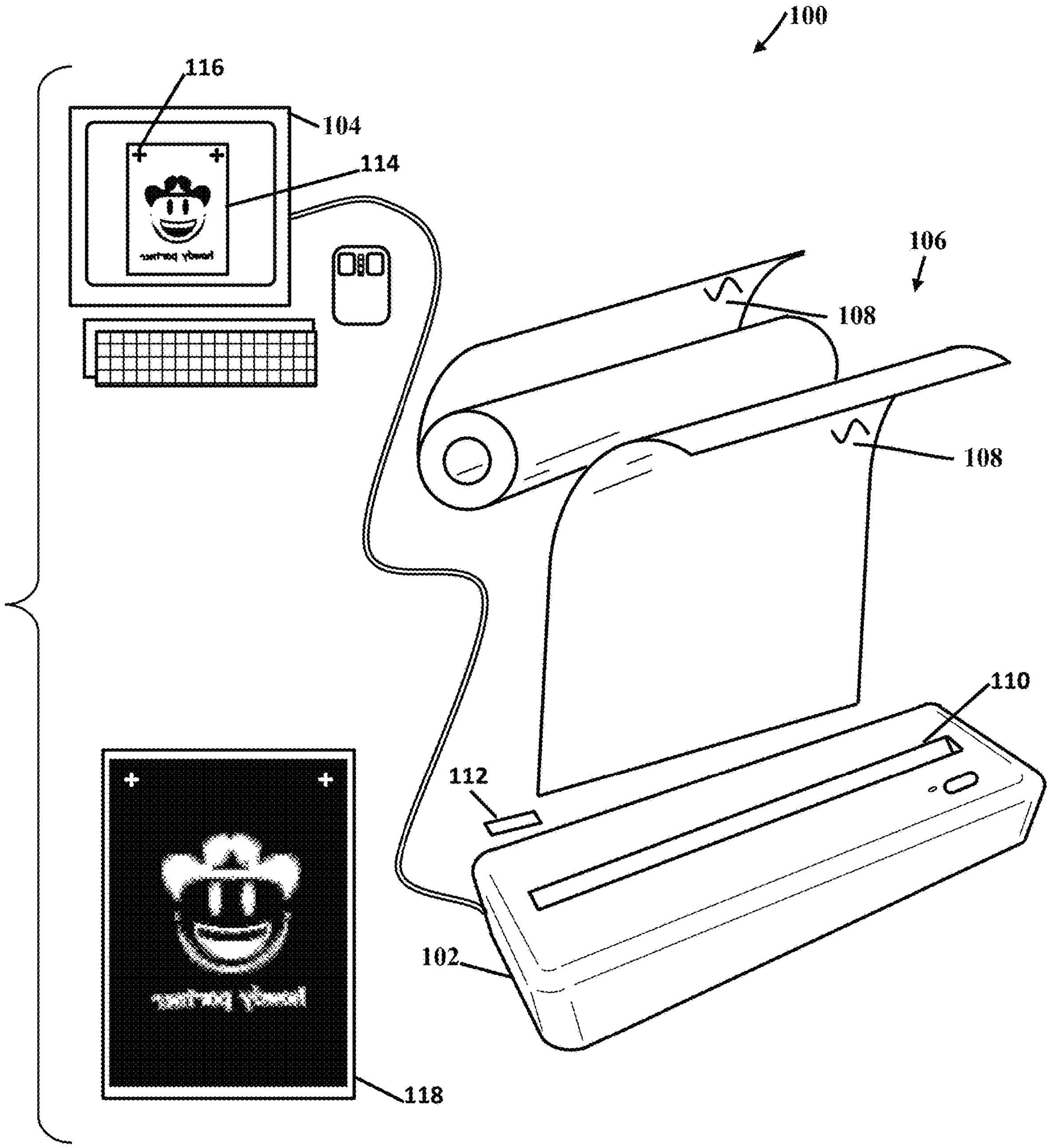
FIG. 1 shows a schematic diagram of an embodiment of a screen-printing system according to this disclosure.

This disclosure is now described more fully with reference to drawings, in which some embodiments of this disclosure are shown. This disclosure may, however, be embodied in many different forms and should not be construed as necessarily being limited to the embodiments disclosed herein. Rather, these embodiments are provided so that this disclosure is thorough and complete, and fully conveys various concepts of this disclosure to skilled artisans.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

As used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

The terminology used herein is for describing particular example embodiments and is not intended to be necessarily limiting of the present disclosure. As used herein, the singular forms "a," "an" and "the" are intended to include the plural forms (e.g., two, three, four, five, six, seven, eight, nine, ten, tens) as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

FIG. 1 shows an embodiment of a system 100 for preparing a stencil sheet 118 which can be used for screen printing. The system 100 includes a thermal printer 102, a computing device 104 (e.g., a computing terminal, a desktop computer, a laptop computer, a tablet computer, a smartphone computer), and a sheet 106 (e.g., an individual sheet or a roll) of thermal stencil paper. As described in greater detail below, the thermal stencil paper has a surface (e.g., between two minor sides and two major sides when rectangular) that includes a coating 108 that is impermeable to a writing medium (e.g., a volume of ink) used for screen printing. For example, the ink itself may be of any color (e.g., red, green, blue) or may be phosphorescent. The thermal printer 102 prints a content 114 (e.g., a text or an image) provided or commanded (e.g., wired, wirelessly) by the computing device 104 onto the sheet 106 of thermal stencil paper by removing a porting of the coating 108, such that a stencil sheet 118 is created with a copy of the printed content 114. In the example of FIG. 1, the dark region of the stencil sheet 118 includes the coating 108, while the coating 108 is removed from the white region. In this way, the stencil sheet 118 includes a copy of the content 114. The copy on the stencil sheet 118 may be a color-inverted copy of the content 114 and/or a mirrored copy of the content 114. As described further below, the stencil sheet 118 can be placed onto a substrate (e.g., a fabric, a textile) and a writing implement (e.g., a squeegee, a brush, a marker) can be used to write on the stencil sheet 118, such that a copy of the content 114 is copied onto the substrate based on the writing medium selectively flowing therethrough.

The thermal printer 102 is any appropriate type of thermal printer. For example, the thermal printer 102 may be a portable thermal printer, such as the iDPRT MT890 Portable Wireless Thermal Printer. The thermal printer 102 that is portable may have a size, shape, volume, and weight allowing the thermal printer 102 to be carried by hand(s) of an average healthy person of age eight to eighty. For example, the thermal printer 102 may weigh about 5, about 4, about 3, or about 2 pounds or less, including intermediate values thereof. For example, the longest dimension of the thermal printer 102 may be about three feet or less, two feet or less, one foot or less, including intermediate values thereof, along any or each of Cartesian axes (e.g., X, Y, Z). The thermal printer 102 may be powered by a battery (e.g., a lithium-ion battery, a lithium-polymer battery, or other appropriate battery) or via a line (e.g., an electrical cable or cord, a Universal Serial Bus (USB) electrical cable or cord). The thermal printer 102 may be a direct thermal printer. For example, a direct thermal printer may not include any ribbon, ink, or toner. The thermal printer 102 may include a thermal printhead containing one or a set of heating elements that are selectively activated to heat specific areas of the sheet 106 of thermal stencil paper as the paper passes through the thermal printer 102.

The thermal printer 102 may receive the content 114 to be printed (or data corresponding to instructions for printing the content 114) via wired or wireless communication. For example, the thermal printer 102 may include a wired interface, such as a serial data interface (e.g., a serial port, a USB port (e.g., a USB-C port, a USB-A port), an Institute of Electrical and Electronics Engineers (IEEE) 1394 interface), a parallel data interface (e.g., Standard Parallel Port (SPP), Enhanced Parallel Port (EPP), Extended Capabilities Port (ECP)), or a wireless interface (e.g., Wi-Fi, Bluetooth, Matter, Li-Fi, Wi-Fi Direct). The thermal printer 102 may be connected to a network (e.g., a local area network, a personal area network, a Bluetooth network) to print data from a server or a cloud computing instance (e.g., a network of remote servers).

During operation, in some embodiments, the thermal printer 102 does not release a fluid (e.g., a liquid), such as a thermally sensitive and/or ultraviolet (UV)-sensitive emulsion, onto the sheet 106 of thermal stencil paper. Instead, certain areas of the coating 108 that are heated by the heating elements of the thermal printer 102 are removed without puncturing the thermal stencil paper (e.g., white regions of the example stencil sheet 188 of FIG. 1), and the coating 108 is retained in areas that are unheated (e.g., dark regions of the example stencil sheet 188 of FIG. 1). In this way, the stencil sheet 118 may be obtained much more rapidly (e.g., within about 10 seconds from starting of the heating elements, depending on the speed of the thermal printer 102) than was possible using previous technology and without requiring deposition of blocking materials, exposure to curing conditions (e.g., heat, UV irradiation, etc.), use of potentially harmful chemicals, and/or other chemical processing steps (e.g., rinsing with water or another fluid).

In some embodiments, the thermal printer 102 is modified to improve compatibility with the thermal stencil paper having the coating 108. For example, certain thermal printers may include a paper sensor, and printing is only allowed to proceed if the paper sensor detects paper. Because it is unconventional to pass the sheet 106 of the thermal stencil paper with the coating 108 through a thermal printer, the sensor may not be adapted to detect the thermal stencil paper. For instance, the sensor may not detect the paper because of the coating's transparent and reflective properties. To overcome this technological challenge, the sensor of the thermal printer 102 may be modified, removed, and/or blocked to prevent sensor errors, which may otherwise disrupt printing. For example, a piece of material, such as a piece of an electrical tape, may be positioned to cover the paper sensor. As another example, the sensor may not be included in the thermal printer 102 or the type of sensor and/or sensitivity settings of the sensor may be adjusted to facilitate the detection of the thermal stencil paper with coating 108.

The computing device 104 of FIG. 1 is illustrated as a personal computer. However, the computing device 104 may be any device capable of transmitting an appropriate signal to the thermal printer 102 to print the content 114 stored on the computing device 104. For example, the computing device 104 may alternatively be a smartphone, a tablet computer, or another suitable device. In some embodiments, all or a portion of the computing device 104 is physically or logically integrated with the thermal printer 102. For example, the thermal printer 102 may include an interface for receiving a data file storing the content 114 and a user interface (e.g., a graphical user interface, a human to machine interface) for selecting (e.g., via a touchscreen) the data file to be printed. The content 114 may be created on the computing device 104 (e.g., locally and/or via a web portal) or loaded (e.g., downloaded) on the computing device 104 from another device (e.g., a memory card, a computing terminal, a network router, a wireless network extender, a print server, a cloud server, a remote server) to communicate signals to the thermal printer 102 to print a copy of the content 114. For example, a printer driver may generate a set of data that includes a set of printer-readable instructions for printing the content 114.

The content 114 may be an image, a collage, an alphanumeric character, a set of text, or a combination of these. If the content 114 is an image, then the content 114 may be a monochrome image or a color image. For color images, the computing device 104 or processing circuitry of the thermal printer 102 may separate the image into separate portions, such that a plurality of stencil sheets 118 are printed, such that each stencil sheet includes a copy of the content 114 for a corresponding color. The content 114 may include one or more registration markers 116 to aid in positioning the stencil sheets corresponding to the different colors on a substrate, as needed, if at all.

In some embodiments, the computing device 104 and/or processing circuitry of the thermal printer 102 preprocesses or modifies the content 114 before it is printed to further improve the quality of the stencil sheet 118. For example, the content 114 may be flipped or mirrored to allow the stencil sheet 118 to be placed on a substrate with the paper layer side touching the substrate. As another example, portions of content 114 that have a darkness level above a threshold value (e.g., have a black level above a threshold percentage in a grayscale image) may result in excessive heating of the thermal stencil paper. This excessive heating can cause printing errors, such as removal of the coating 108 beyond a target region or fraying of the paper layer. To overcome this, the content 114 may be modified by adjusting the opacity of the image to a predefined range, for example, between about 55% to 75%. Other preprocessing techniques may be performed to improve the quality of the resulting stencil sheet 118.

As described above, the sheet 106 of thermal stencil paper may be provided as one or more individual sheets or as a roll (e.g., depending on the use case and/or the configuration of the thermal printer 102). For example, the term "sheet" may refer to an individual or multiple sheets of the thermal stencil paper or to a roll of the thermal stencil paper, as technologically appropriate or possible. The thermal stencil paper includes a paper layer on which a layer of the coating 108 is disposed. The paper layer may be hemp paper or another suitable paper through which a writing medium (e.g., paint, ink, dye, etc.) can pass through. Meanwhile, the coating 108 may be a material through which the writing medium cannot pass through. For example, the coating 108 may be a thin plastic layer disposed on the paper layer. The plastic layer may be a polyester, such as polyethylene terephthalate (PET), or a resin. When exposed to an elevated suitable temperature by a heating element of the thermal printer 102, the coating 108 may be removed from the stencil paper. As an example, the stencil paper may be a risograph master paper, such as Risograph Masters S7040UA B4 or similar. However, other suitable stencil papers may be used.

In an example operation of the system 100, a user prepares or obtains the content 114 that the user desires to copy onto a substrate. The content 114 may be provided by a data file, such as a digital image or text file. If not already inserted, then the sheet 106 of the thermal stencil paper is inserted into the paper slot 110 of the thermal printer 102 or otherwise installed in the thermal printer 102 with the coating side facing down, as shown in FIG. 1. The user operates the computing device 104 to command the printer 102 to print a copy of the content 114 with the thermal printer 102. For example, the user may operate a suitable application program running on an operating system (OS) hosted on the computing device 104 and navigate to and select a print command on the suitable application program, causing the computing device 104 to command or transmit data to the thermal printer 102 that causes the thermal printer 102 to print a copy of the content 114 on the sheet 106 of the thermal stencil paper. As described above, the content 114 may be pre-processed by adjusting the opacity of the content 114 and/or generating a flipped or mirrored version of the content 114.

From the computing device 104, the thermal printer 102 receives data (e.g., data files, object code) including instructions for printing a copy of the content 114, which may be generated by a printer driver of the computing device 104. The thermal printer 102 then prints the copy of the content 114 to generate the stencil sheet 118. As described above, during printing, the heating elements of the printer's thermal printhead are activated to heat specific areas of the sheet 106 of thermal stencil paper as the paper passes through the thermal printer 102. The coating 108 is removed from regions that are heated, while the coating 108 is retained in unheated regions, resulting in the generation of the stencil sheet 118. In this example operation, the stencil sheet 118 may be generated without the deposition of a fluid from the thermal printer 102 on the stencil paper. The stencil sheet 188 may be generated, for example, without performing any curing steps, such as exposing the stencil paper to UV light, heating the stencil paper, or others. The stencil sheet 188 may be generated, for example, without allowing the stencil paper to rest for an extended period of time, such as overnight. Instead, the stencil sheet 118 may be used immediately after the stencil sheet 118 is printed to screen print a copy of the content 114 on a substrate.

The user may remove (e.g., manually by hand) the stencil sheet 118 from the thermal printer 102. The stencil sheet 118 may be trimmed to a desired size. The stencil sheet 118 may then be placed on a substrate. A writing implement may then be used to write on the stencil sheet 118. For example, the writing implement may receive a coloring medium, such as paint, ink, dye, or the like, and transfer the coloring medium through the stencil sheet 118, such that a copy of the content 114 is copied onto the substrate. Any appropriate writing implement for a given coloring medium may be used. For example, the writing implement may be a squeegee, a sponge, a brush, a swab, a roller, a scraper, an airbrush, or other suitable writing implements. In some embodiments, the writing implement is a marker or a pen. In some embodiments, the writing implement is a combination of two or more implements, such as a squeegee for spreading paint with an integrated paint tube for dispensing the paint. The writing medium may be any paint, ink, dye, or the like that is compatible with a given substrate. Further examples of writing medium and writing implements are described below with respect to the kit 300 of FIG. 3.

The substrate may be any material capable of receiving the writing medium. For example, the substrate may be paper, fabric, wood, plastic, ceramic, glass, rubber, rocks, gems, metal, alloy, or another material, whether natural or synthetic. The substrate may be a textile. Examples of textiles include materials used to make clothing, containers, and other consumer products. Examples of textiles include, but are not limited to, linen, cotton, polyester, wool, silk, hemp, nylon, rayon, denim, and canvas, whether natural or synthetic. In some embodiments, the substrate is a container, whether having concave, convex, arcuate, circular, oval, trapezoid, pentagonal, polygonal, or flat surfaces, whether symmetrical or asymmetrical. Examples of containers include, but are not limited to, jars, cups, bottles, jugs, tumblers, tins, cans, buckets, drums, bags, sacks, totes, pouches, boxes, crates, and barrels. The substrate may be an item of clothing, such as a shirt, a skirt, a dress, a pair of pants, a pair of shorts, a jacket, a scarf, a hat, a sock, or another suitable item, which may include a footwear item, such as a sneaker.

After the copy of the content 114 is transferred to the substrate, additional operations may be performed to cure the coloring medium on the substrate. For example, the stencil sheet 118 may be removed from the substrate after the coloring medium has been transferred from the writing implement through the stencil sheet 118. The substrate with the applied coloring medium may be allowed to dry (e.g., via an electrically powered fan) for a period of time or the coloring medium may be dried and/or heated by exposure to a flow of air (e.g., ambient air, heated air) and/or an elevated temperature (e.g., via a heating element) or cured by exposure to UV light or other curing conditions.

Figure 2A:
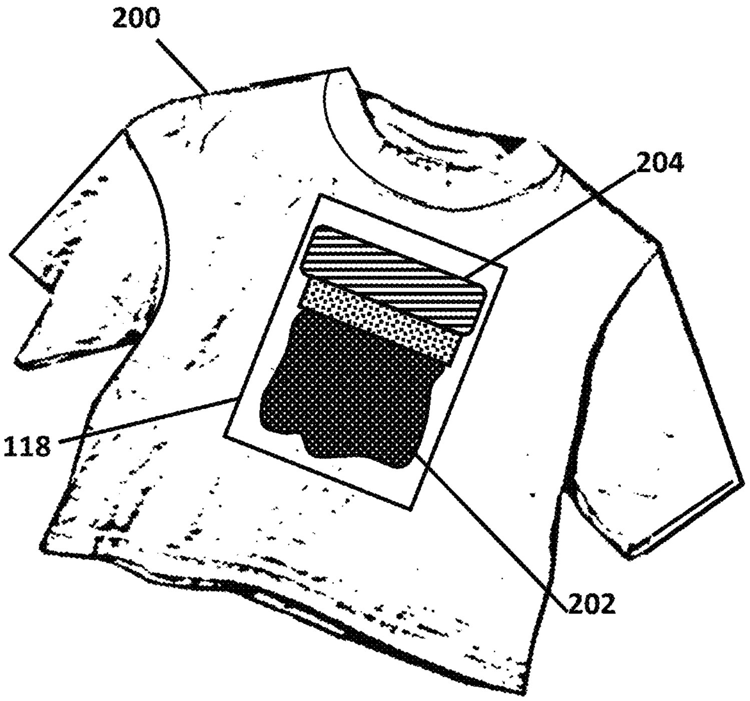
FIGS. 2A and 2B show schematic diagrams of using the stencil sheet of FIG. 1 to write on a substrate according to this disclosure.
Figure 2B:

FIGS. 2A and 2B illustrate the application of a coloring medium 202 on a substrate, which in this example is a shirt 200. FIG. 2A illustrates the use of a stencil sheet 118 in a screen-printing process, and FIG. 2B illustrates the outcome of the screen-printing process. As shown in FIG. 2A, the stencil sheet 118 is positioned on the shirt 200, and the coloring medium 202 (e.g., an ink, dye, or paint) is applied to the stencil sheet 118 using a writing implement 204. In this example, the writing implement 204 is a squeegee. However, another type of writing implement may be used. Likewise, other types of garments may be used.

After the writing medium 202 has been passed through the stencil sheet 118, the stencil sheet 118 is removed to reveal the copied content 206, which has been transferred to the shirt 200. If additional colors are desired, then additional stencil sheets can be created and used in the same manner to create a multi-color design. UV exposure, heating, drying, or other methods can be used between printing colors or after the initial color has been applied. In some embodiments, the stencil sheet 118 can be reused if desired. In other embodiments, the stencil sheet 118 is discarded after use.

Figure 3:
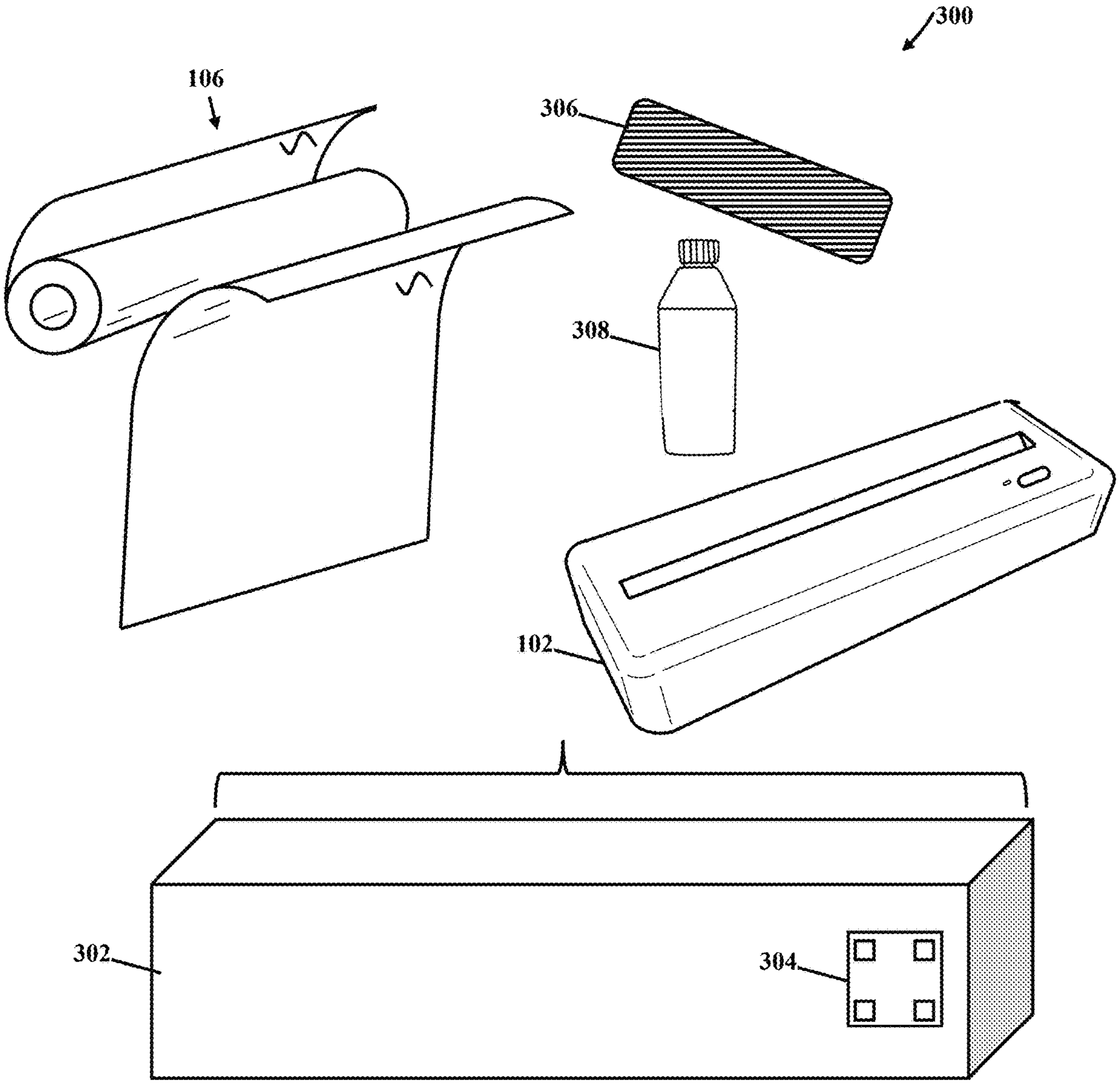
FIG. 3 shows a schematic diagram of an embodiment of a screen-printing kit according to this disclosure.
Figure 4:
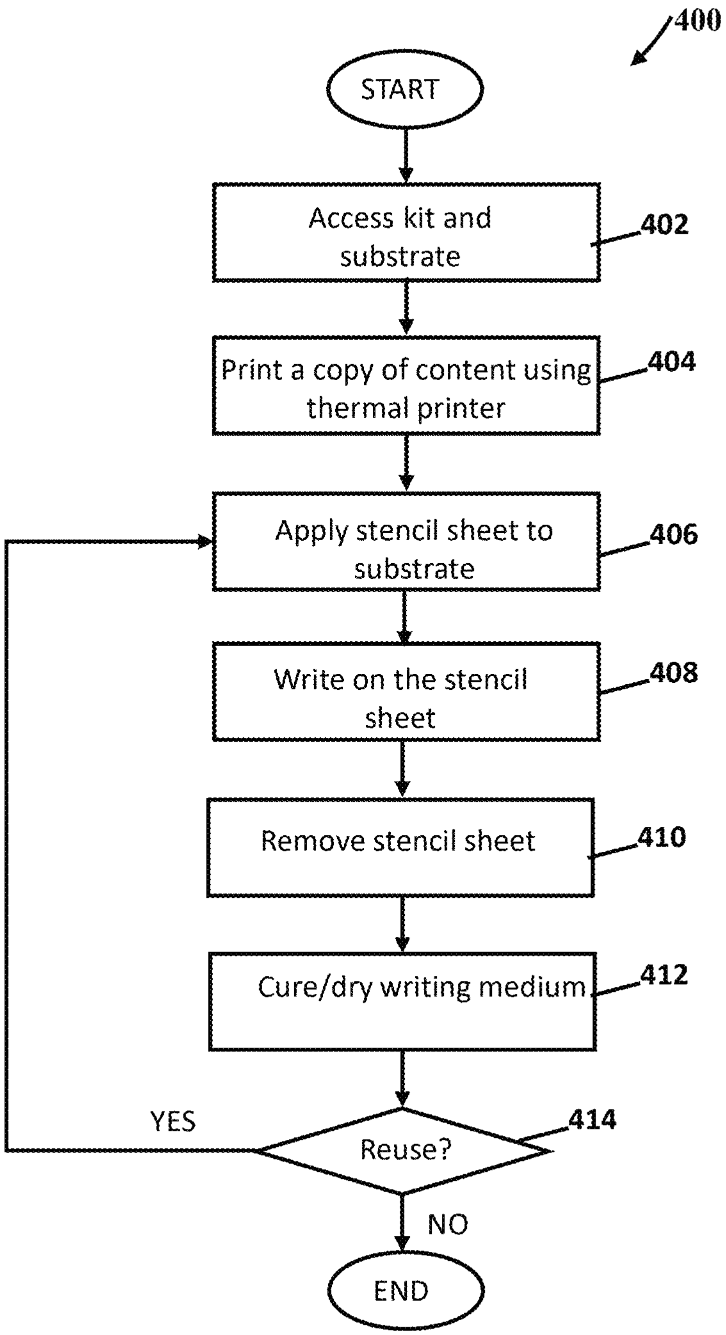
FIG. 4 shows an embodiment of a flowchart for preparing a stencil sheet and screen printing using the stencil sheet according to this disclosure.

FIG. 3 illustrates an embodiment of a kit 300 which may be used for screen printing. The kit may include a container 302 storing a thermal printer 102, a sheet 106 of thermal stencil paper, a writing implement 306 functionally external to or separate and distinct from the thermal printer 102, and a set of instructions 304 to perform a method as disclosed herein. The kit 300 may also include a writing medium 308 functionally external to or separate and distinct from the thermal printer 102. The thermal printer 102 and the sheet 106 of thermal stencil paper are described above with respect to FIG. 1. The container 302 is any container capable of holding components of the kit 300, which may be suitable for packaging, storage, shipping, and delivery via a postal service (e.g., USPS) or a commercial courier (e.g., DHL, FedEx, UPS). For example, the container 302 may be a box, a bag, a tote, a pouch, or the like. The instructions 304 may be printed instructions (e.g., a booklet included in the container 302), digital instructions (e.g., a USB drive or other portable memory storing the instructions), or a link to a source of the instructions (e.g., a web address, QR code, or the like directing a user to a website providing the instructions). The instructions 304 may provide a list of operations for using the kit (e.g., as illustrated in the example of FIG. 4, described below). For example, the computing device 104 may be enabled for accessing the digital instructions or the link to the source of the instructions.

Any appropriate writing implement 306 for a given writing medium 308 may be included in the kit 300. For example, the writing implement 306 may be a squeegee, a sponge, a brush, a swab, a roller, a scraper, an airbrush, or another suitable writing implement. In some embodiments, the writing implement 306 is a marker or a pen. In some embodiments, the writing implement 306 is a combination of two or more implements, such as a combined squeegee and paint tube, which includes a squeegee for spreading paint with an integrated paint tube for dispensing the paint. The writing medium 308 may be any paint, ink, dye, or the like that is compatible with a given substrate. Examples of the writing medium 308 include, but are not limited to, acrylic paints, water-based paints, oil-based paints, screen printing inks or other inks, and dyes.

FIG. 4 illustrates an embodiment of a method 400 of using the system 100 of FIG. 1 and/or the kit 300 of FIG. 3 to prepare a stencil sheet 118 and use the stencil sheet 118 for screen printing a copy of content 114 onto a substrate, as disclosed herein. The method has a set of steps 402-414 schematically exemplified by a corresponding set of blocks shown in FIG. 4.

The method 400 may begin at block 402 where a user (e.g., a person) accesses the sheet 106 of thermal stencil paper, the thermal printer 102, the writing implement 306, the substrate, and a data file (e.g., a PDF file, PNG file, a JPG file, a word processor file) containing the content 114. At block 404, the user causes the thermal printer 102 (e.g., by operating the computing device 104) to print a copy of the content 114 onto the sheet 106 of the thermal stencil paper. As described above, the thermal printer 102 prints the copy by removing a portion of the coating 108 from the thermal stencil paper without perforating or puncturing the thermal stencil paper, such that the sheet 106 of thermal stencil paper becomes a stencil sheet 118 stenciling the copy. At block 406, the user may remove the stencil sheet 118 from the thermal printer 102 and place the stencil sheet 118 onto the substrate. At block 408, the user causes the writing implement 306 (e.g., by operation thereof) to write on the stencil sheet 118 such that the content 114 is copied onto the substrate. At block 410, the stencil sheet 118 is removed from the substrate. At block 412, the substrate is allowed to dry or is otherwise processed to cure the writing medium (e.g., by heating, air drying, exposure to UV light, etc.). At block 414, the user determines whether the stencil sheet 118 will be reused. If the stencil sheet 118 will be reused, then the user returns to block 406 to apply the stencil sheet 118 to another substrate. However, if the stencil sheet 118 will not be reused, then the method 400 ends, and the stencil sheet 118 may be discarded. Note that other suitable actions may be performed in the method 400, between any two of steps 402-414.

As demonstrated above, the methods and tools of this disclosure may enable users to create screen-print quality products without requiring hours of labor or costly, specialized equipment. The disclosed technology may enable screen printing to be performed without large or specialized workspaces and without the use of potentially harmful chemicals or the waste of water to prepare a stencil sheet. As such, the disclosed technology may be useful for a range of users and industries, including, for example, screen printers, small-scale print shops, home crafters, clothing designers, band merchandise companies, art studios, and brick-and-mortar small business owners. Furthermore, alternative embodiments of the disclosed technology may be employed to apply makeup, face paint, or temporary tattoos. Other embodiments may be used to screen print electronic components, such as custom batteries, electronic circuits, or similar components.

The flowchart and block diagrams in the Figures illustrate the architecture, functionality, and operation of possible implementations of systems and methods according to various embodiments of the present disclosure. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein. As used herein, the term "about" and/or "substantially" refers to a +/−10% variation from the nominal value/term. Such variation is always included in any given.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method, comprising:

enabling an end user to:

access (i) a sheet of thermal stencil paper, (ii) a thermal printer, (iii) a writing implement, (iv) a substrate, and (v) a data file containing a content;

cause the thermal printer to print a copy of the content onto the sheet of thermal stencil paper without perforating or puncturing the sheet of thermal stencil paper such that the sheet of thermal stencil paper becomes a stencil sheet stenciling the copy;

place the stencil sheet onto the substrate; and cause the writing implement to write on the stencil sheet such that the copy is further copied onto the substrate.

2. The method of claim 1, wherein the thermal printer is a direct thermal printer.

3. The method of claim 1, wherein the substrate is a textile.

4. The method of claim 1, wherein the substrate is a container.

5. The method of claim 1, wherein the writing implement writes on the stencil sheet by receiving a coloring medium and transferring the coloring medium through the stencil sheet such that the copy is further copied onto the substrate.

6. The method of claim 5, further comprising:

enabling the end user to:

remove the stencil sheet from the substrate after the coloring medium has been transferred from the writing implement through the stencil sheet such that the copy is further copied onto the substrate; and cause the substrate to be dried or heated.

7. The method of claim 1, wherein the writing implement comprises a squeegee, a sponge, a brush, a swab, a roller, a scraper, or an airbrush.

8. The method of claim 1, wherein the writing implement is a marker or a combined squeegee and paint tube.

9. The method of claim 1, wherein the thermal printer is portable.

10. The method of claim 1, wherein the writing implement writes on the stencil sheet with a coloring medium such that the copy is further copied onto the substrate, wherein the sheet of thermal stencil paper has a coating impermeable to the coloring medium, wherein the thermal printer prints the copy of the content onto the sheet of thermal stencil paper without perforating or puncturing the sheet of thermal stencil paper by removing a portion of the coating corresponding to the content such that the sheet of thermal stencil paper becomes the stencil sheet stenciling the copy.

11. The method of claim 1, wherein the thermal printer is a direct thermal printer, wherein the substrate is a textile, wherein the writing implement comprises a squeegee, a sponge, a brush, a swab, a roller, a scraper, or an airbrush, wherein the thermal printer is portable, wherein the writing implement writes on the stencil sheet with a coloring medium such that the copy is further copied onto the substrate, wherein the sheet of thermal stencil paper has a coating impermeable to the coloring medium, wherein the thermal printer prints the copy of the content onto the sheet of thermal stencil paper without perforating or puncturing the sheet of thermal stencil paper by removing a portion of the coating corresponding to the content such that the sheet of thermal stencil paper becomes the stencil sheet stenciling the copy, wherein the writing implement writes on the stencil sheet by receiving the coloring medium and transferring the coloring medium through the stencil sheet such that the copy is further copied onto the substrate, and further comprising:

enabling the end user to:

remove the stencil sheet from the substrate after the coloring medium has been transferred from the writing implement through the stencil sheet such that the copy is further copied onto the substrate; and cause the substrate to be dried or heated.

12. A kit, comprising:

a container storing a thermal printer, a sheet of thermal stencil paper, a writing implement, and a set of instructions to perform a method comprising:

enabling an end user to:

access (i) the sheet of thermal stencil paper, (ii) the thermal printer, (iii) the writing implement, (iv) a substrate, and (v) a data file containing a content;

cause the thermal printer to print a copy of the content onto the sheet of thermal stencil paper without perforating or puncturing the sheet of thermal stencil paper such that the sheet of thermal stencil paper becomes a stencil sheet stenciling the copy;

place the stencil sheet onto the substrate; and cause the writing implement to write on the stencil sheet such that the copy is further copied onto the substrate.

13. The kit of claim 12, wherein the thermal printer is a direct thermal printer.

14. The kit of claim 12, wherein the substrate is a textile.

15. The kit of claim 12, wherein the substrate is a container.

16. The kit of claim 12, wherein the writing implement writes on the stencil sheet by receiving a coloring medium and transferring the coloring medium through the stencil sheet such that the copy is further copied onto the substrate.

17. The kit of claim 16, wherein the method further comprising:

enabling the end user to:

remove the stencil sheet from the substrate after the coloring medium has been transferred from the writing implement through the stencil sheet such that the copy is further copied onto the substrate; and cause the substrate to be dried or heated.

18. The kit of claim 12, wherein the writing implement comprises a squeegee, a sponge, a brush, a swab, a roller, a scraper, or an airbrush.

19. The kit of claim 12, wherein the writing implement is a marker or a combined squeegee and paint tube.

20. The kit of claim 12, wherein the thermal printer is portable.

21. The kit of claim 12, wherein the writing implement writes on the stencil sheet with a coloring medium such that the copy is further copied onto the substrate, wherein the sheet of thermal stencil paper has a coating impermeable to the coloring medium, wherein the thermal printer prints the copy of the content onto the sheet of thermal stencil paper without perforating or puncturing the sheet of thermal stencil paper by removing a portion of the coating corresponding to the content such that the sheet of thermal stencil paper becomes the stencil sheet stenciling the copy.

22. The kit of claim 12, wherein the thermal printer is a direct thermal printer, wherein the substrate is a textile, wherein the writing implement comprises a squeegee, a sponge, a brush, a swab, a roller, a scraper, or an airbrush, wherein the thermal printer is portable, wherein the writing implement writes on the stencil sheet with a coloring medium such that the copy is further copied onto the substrate, wherein the sheet of thermal stencil paper has a coating impermeable to the coloring medium, wherein the thermal printer prints the copy of the content onto the sheet of thermal stencil paper without perforating or puncturing the sheet of thermal stencil paper by removing a portion of the coating corresponding to the content such that the sheet of thermal stencil paper becomes the stencil sheet stenciling the copy, wherein the writing implement writes on the stencil sheet by receiving the coloring medium and transferring the coloring medium through the stencil sheet such that the copy is further copied onto the substrate, and wherein the method further comprising:

enabling the end user to:

remove the stencil sheet from the substrate after the coloring medium has been transferred from the writing implement through the stencil sheet such that the copy is further copied onto the substrate; and cause the substrate to be dried or heated.

* * * * *